United States Patent Office 3,849,402
Patented Nov. 19, 1974

---

3,849,402
19-OXYGENATED AND 19-NORΔ⁸⁽¹⁴⁾-STEROID COMPOUNDS
Gunther Kruger, St. Laurent, Quebec, Canada, assignor to Steele Chemicals Co. Ltd., Pointe Claire, Quebec, Canada
No Drawing. Filed Jan. 5, 1972, Ser. No. 215,669
Claims priority, application Canada, Jan. 6, 1971, 102,448; May 3, 1971, 112,028
Int. Cl. C07c 173/00
U.S. Cl. 260—239.55 R          11 Claims

ABSTRACT OF THE DISCLOSURE 19,8 - lactone steroids or derivatives; 14,19 - dioxygenated steroids and 14-dehydro analogs; 14-functionalized 8,19 - oxido steroid derivatives; 4,6,8(14) - triene steroids; and 19-oxygenated and 19-norΔ⁸⁽¹⁴⁾-steroids; as well as processes for preparing such compounds.

---

This invention relates to novel compounds and processes of their manufacture.

More particularly, one aspect of this invention relates to novel compounds of the formula I

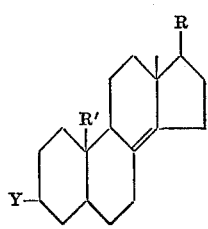

wherein Y, R and R' are as defined below.

From the literature certain 4,5-dihydroxy-8(14)-enes, 3β-oxygenated cholest-8(14)-enes and ergost-8(14)-enes are known, as described, for example, in W. F. Johns, J. Org. Chem., *31*, 3780 (1966), J. W. Cornforth et al., Bioch., *65*, 94 (1957) or G. L. Laubach et al., *78*, 4743, J.A.C.S. (1956) or L. F. Fieser and M. Fieser, Steroids, p. 319 (1967), Reinhold Publishing Corporation, New York.

The cholest-8(14)-enes have found use only for academic studies, and no known practical use for such compounds has been found. Such compounds further are not amenable for substitution in the 19-position by oxygenated groups. Likewise, the above 4,5-dihydroxy - 8(14)-enes are mixtures of optical isomers and no methods of separating the isomers have been reported and further no practical utility for such compounds is known. The ergost-8(14)-enes are primarily the result of academic studies on the chemistry of ergosterol. Again, no utility for such compounds is known. Thus, in the prior art to date, steroidal 8(14)-enes are primarily academically interesting compounds with no practical utility or potential utility as intermediates for the preparation of useful end products.

Likewise, prior art teachings relating to the preparation of steroidal 8(14)-enes of the above general type, result normally in inferior yields as compared to the processes of the present invention, as described hereinafter in greater detail.

In accordance with one aspect of the present invention, there are provided processes which overcome the disadvantages of the prior art; and still further, there are provided novel products which have valuable utility as intermediates for the preparation of other valuable compounds, as described hereinafter in greater detail.

More particularly, there are provided novel compounds of the formula I

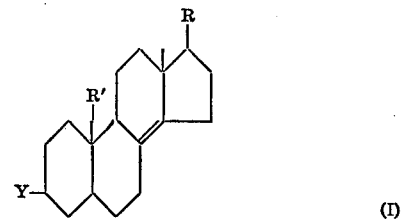

wherein R is selected from the group consisting of

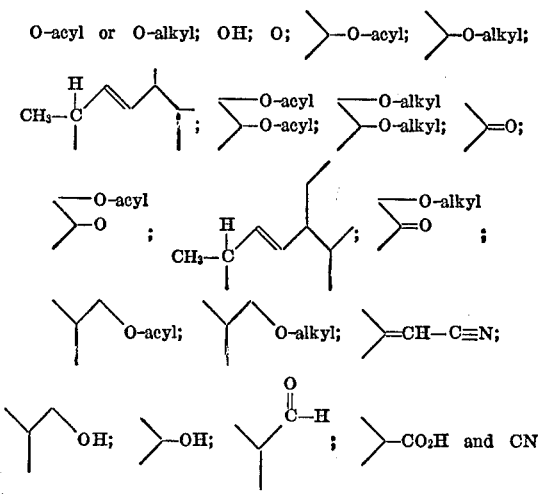

wherein alkyl is tetrahydropyranyl, lower alkyl, preferably methyl, or a substituted methyl wherein the substituent is selected from the group consisting of phenyl, halogen, preferably chlorine and bromine, methoxy, $$CH_2=CH \text{ and } HC\equiv C$$

wherein acyl represents a group selected from those consisting of acetate, lower trialkyl acetates wherein the lower alkyl group is preferably methyl or ethyl, monohalo acetates and trihalo acetates, preferably wherein the halogen is chlorine, fluorine and bromine; wherein Y is selected from the group consisting of O=, HO—, O-alkyl and O-acyl, and wherein R' is chosen from the group of H, $CH_2OH$, $CH_2$—O—CO—NH—$C(CH_3)_3$, $CH_2O$alkyl and $CH_2O$acyl, alkyl and acyl being defined as above.

In accordance with one aspect of the present invention, there is provided a process for producing the above compounds, which process is selected from the group consisting of:

(a) Reducing a compound of the formula (II) to form a compound of the formula (I), according to the following:

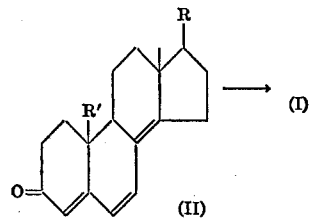

wherein R and R' are as defined above;

(b) Subjecting a compound of the formula (III) to successive base-acid treatment to form a compound of the formula (IV), and subsequently reducing the latter to form a compound of the formula (V), and if desired acetylating the latter compound, and reducing the compound of the formula (V) to form a compound of the formula (I), according to the following:

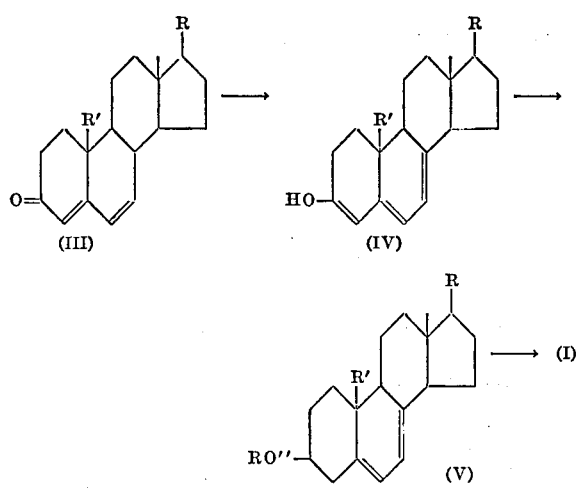

wherein R and R' are as defined above and R'' is H or acetyl;

(c) Reducing and concomitantly isomerising a compound of formula (VII) to form directly a compound of formula (I) or reducing a compound of the formula (VII) to first form an allyl alcohol of the formula (VIII), and then reducing the latter with concomitant isomerisation to a compound of the formula (I), according to the following:

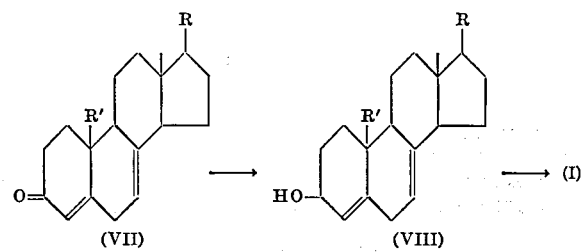

wherein R and R' are as defined above;

(d) Reducing a compound of the formula IX, or X to form a compound of the formula I without isolation of the intermediate (IX), according to the following:

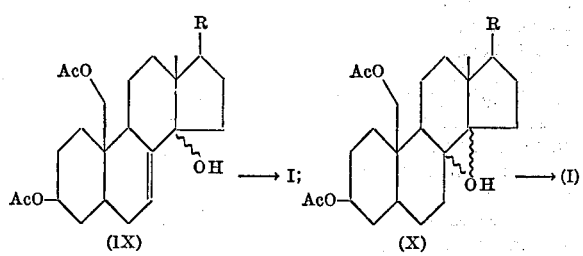

wherein R is as defined above;

(e) Reducing a compound of the formula XI to form a compound of the formula XIII and treating the latter to eliminate the tetriary 8-hydroxy group to form a compound of formula I according to the following

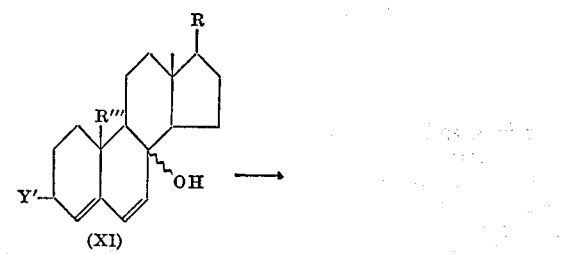

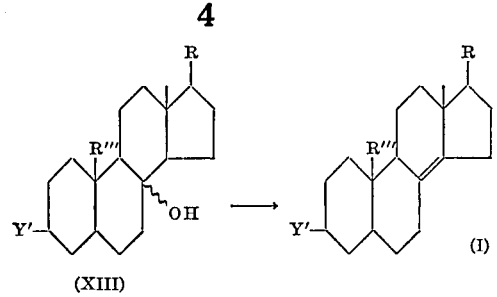

wherein R is as defined above, R''' is CH$_2$OH or CH$_2$OAc; and Y' is O or OH.

In method (a) the step of reduction of the compound of formula II may be carried out in several different ways, with different reducing agents as described hereinafter. Thus, for example, a compound of formula II may be initially reduced with, e.g. a metal hydride reducing agent to convert the 3-keto group to the corresponding 3-hydroxy group, with subsequent reduction of the latter intermediate to a compound of the formula (I) by e.g. catalytic hydrogenation. Alternately, the last reduction step may be carried out using a dissolving metal e.g. an alkali or earth alkali metal, in suitable solvents (e.g. a suitable alcohol or amine, etc.).

A further embodiment for the reduction of the compound of the formula (II) is wherein the 4 and 6 double bonds are reduced directly to form compounds of formula (I). In this embodiment, reduction may be carried out by hydrogen in the presence of a metal catalyst, such as, e.g. palladium metal catalysts or Raney nickel. Alternately, reduction with a dissolving metal (in a suitable solvent) e.g. lithium in liquid ammonia, sodium in ethanol etc. may be employed. In carrying out either of the above reduction processes, it is believed that there is a plurality of intermediates which may be formed. These intermediates may be, without being limiting, the corresponding 6,8(14)-dienes, 4,8(14)-diens, and 5,8(14)-dienes.

It has been unexpectedly found that, in carrying out the above process, the 5α- and 5β-hydrogen steriods can be produced as major products by appropriate adaptation of reaction conditions whereby one can direct the reaction to the formation of the desired isomer. Thus, for example, hydrogenation of the compound of formula (II) can afford predominantly the 5β-hydrogen steroid of formula (I); conversely, when the 3-hydroxy intermediate, obtained by reducing a compound of the formula (II) with a metal hydride reducing agent, is catalytically hydrogenated there may be predominantly obtained compounds of formula (I) of the 5α-hydrogen series. In one embodiment of process (a), the hydrogenation of the 3-hydroxy-4,6,8(14)-triene is carried out in the presence of an additional amount of aqueous potassium hydroxide in conjunction with a water-immiscible solvent.

The trienones used as starting material of process (a) may be obtained by any of the methods disclosed in this application.

In process (b) of the present invention, the initial step consists in the conversion of a 4,6-dien-3-one of formula (III) into a trienol of formula (IV) by successive base-acid treatments. Subsequently the enolic function of (IV) in position 3,4 is reduced to form a 5,7-dien-3-ol of formula (V) wherein R'' is H. This reduction may be carried out by, for example, using a reducing agent such as a metal hydride in the presence of an appropriate solvent. A typical metal hydride is sodium borohydride in methanol. Subsequent optional aceytlation under conventional conditions, e.g. by acetic anhydride in pyridine, yields then 3-acetate V, wherein R'' is acetyl. Subsequent treatment of the latter with hydrogen in the presence of a platinum metal catalyst, e.g. palladium on charcoal, in a suitable solvent, e.g. ethyl acetate, yields a compound of formula (I), in which the 5-hydrogen atom is in the α-position.

If desired, the hydrogenation of the compound of the formula (V) may be interrupted by shortening the treatment of said compound under hydrogenation conditions whereupon there is formed the compound of the formula (VI).

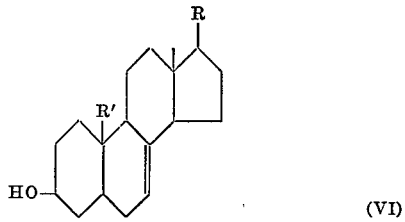

(VI)

The compound of the formula (VI) thus obtained is predominantly the 5α-hydrogen isomer and this may be converted to a compound of the formula (I) by further continuing the treatment under hydrogenation conditions described above.

In process (c), a compound of formula (VII) is subjected either directly to the conditions of catalytic hydrogenation, or is first reduced to an allyl alcohol (VIII) and is then subjected to hydrogenation conditions. When the ketone (VII) is directly subjected to the hydrogenation conditions, a mixture of compounds is formed initially which consists of the following isomers:

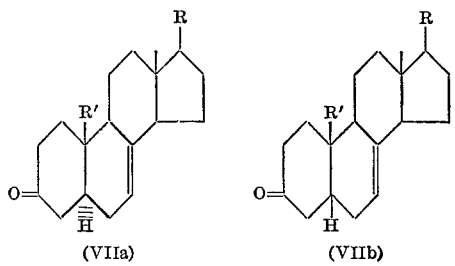

(VIIa)         (VIIb)

On a prolongation of the treatment under hydrogenation conditions, the 5α-hydrogen ketone VIIa is isomerized into 8(14)-ene (I) wherein Y is O=, while the 5β-hydrogen ketone (VIIb) appears essentially uneffected. On still further prolongation of the treatment, the compounds (I) wherein Y is O= can be converted to alcohols (I), Y being OH. The latter compounds may also be obtained from the corresponding ketones (I) wherein Y is O=, by reduction with metal hydrides as described above. The treatment under the hydrogenation conditions may be carried out as described above, employing hydrogen, catalysts, e.g. palladium and organic solvents, e.g. ethyl acetate. In the reduction of the ketone formula VII to the allyl alcohols of formula VIII metal hydrides, e.g. sodium borohydride or tri-t-butoxyaluminum hydride, and suitable solvents, e.g. methanol or tetrahydrofuran, respectively, are employed.

In carrying out process (d) of the present invention a 14-hydroxy-7-ene of formula IX or an 8,14-oxido steroid of formula X is treated with hydrogen in the presence of a metal catalyst, e.g. palladium, and a suitable solvent, e.g. methanol or acetic acid.

The 14-hydroxy-7-enes (IX), and 8,14-oxido steroids (X) used as starting materials may, for example, be obtained by the processes disclosed in this application, for example by converting the corresponding 4,6,8(14)-trien-3-ones into 8,14-oxido-4,6-dien-3-ones by treatment with a peracid, reducing the latter to 8,14-oxido-3-hydroxy-4,6-dienes by means of a metal hydride; subsequent treatment of the latter under hydrogenation conditions affords first the corresponding saturated 8,14-oxido-3-ols and then, by rearrangement under the hydrogenation conditions, the corresponding 3,14-dihydroxy-7-enes. Finally, acetylation by conventional methods yields compounds of formula IX and X respectively.

In carrying out process (e), the compound of the formula XI is initially reduced to a compound of the formula XII, in which the 3-keto group is converted to a 3-hydroxy group. This reduction step may be carried out by using a metal hydride reducing agent, such as sodium borohydride in methanol. The 3-hydroxy compound of formula XII

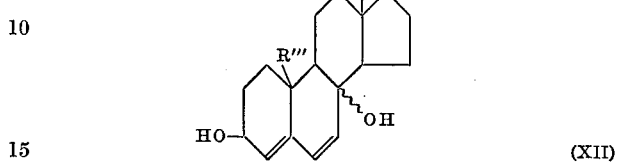

(XII)

may then be subjected to hydrogenation according to conventional techniques to form a compound of the formula XIII which may then be dehydrated according to conventional procedures well known to those skilled in the art to form a compound of the formula I. In an alternate embodiment, a compound of the formula XI is hydrogenated to form a corresponding 3-keto compound of the formula XIV

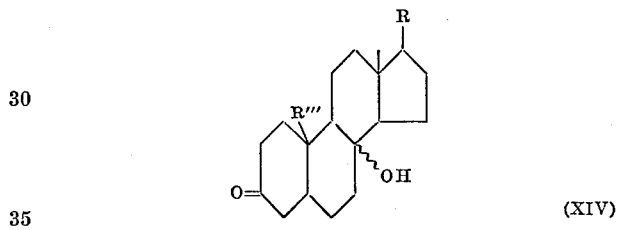

(XIV)

in which the 5-hydrogen atom may be either in the α- or β-position. This latter compound may then be dehydrated according to conventional procedures to directly form a compound of the formula I. As a still further alternative, if desired, a compound of the formula XI or the corresponding 3-alcohol (XII) may be subjected to catalytic hydrogenation as described above to yield directly the desired compound of formula I by reduction, hydrogenolysis and rearrangement under the hydrogenation conditions, i.e. the reduction leads to the saturation of the olefinic double bond in position 4, the hydrogenolysis leads to the conversion of the 8-hydroxy-6-ene moiety into a 7-double bond while the rearrangement causes the latter to migrate to the desired 8(14)-position.

The processes of the present invention have many advantageous and unexpected features over prior art teachings.

Thus process (a) allows the preparation of 8(14)-enes from the readily available 4,6,8(14)-trienones as described hereinafter in a simple manner not requiring extensive purification procedures such as chromatography.

It is a special advantage of process (a) that it can be readily adapted to the preparation of 5α-hydrogen as well as 5β-hydrogen steroids of formula I as major products. It is a further special advantage that it is particularly useful for the preparation of 19-oxygenated and 19-nor steroids.

Though there have been reported studies on the hydrogenation of steroidal 3-hydroxy-4-enes, the hydrogenation of the related 3-hydroxy-4,6,8(14)-enes is believed to be novel. Moreover, the previously reported hydrogenations of 3-hydroxy-4-enes yielded mainly to 5β-hydrogen 3-alcohols and were accompanied by the extensive formation of by-products through hydrogenolysis of the 3-hydroxy group (cf. C. W. Shoppee, J.C.S., 3107 (1957)). By contrast, in the hydrogenation of the 3-hydroxy-4,6,8 (14)-trienes, 5α-hydrogen 8(14)-enes are formed and hydrogenolysis of the 3-hydroxy group occurs only to a moderate degree. In a preferred method of hydrogenation of this invention, a biphasial mixture, consisting of a solution of the starting material in a water-immiscible solvent such as ethyl acetate and a dilute aqueous potassium hydroxide solution, is treated with hydrogen in the presence of a noble metal catalyst. By this method the formation of hydrogenolysis products and other by-products is still further suppressed and the 5α-hydrogen 8(14)-enes can be virtually the only reaction products.

In the case where the formation of 5β-hydrogen 8(14)-enes is desired, 4,6,8(14)-trien-3-ones are used as starting materials in the hydrogenation instead of the corresponding 3-alcohols.

With respect to process (b), the 5,7-dienes used as starting materials, are not prepared as in the prior art (cf. J. W. Cornforth et al., Bioch., 65, 94 (1957)) from 5-enes via photochemical halogenation of the 7-position and subsequent elimination, but from 4,6-dien-3-ones by a considerably simpler manner not requiring the agencies of heat and light. The latter 3-ones are first converted into their 3,5,7-trienols by successive base-acid treatment, which are then reduced with sodium borohydride, or other metal hydrides, to the corresponding 3-hydroxy-5,7-dienes without further purification. Another advantage of process (b) resides in the direct conversion of the 5,7-dienes into the desired 8(14)-enes of formula (I) under hydrogenation conditions. By contrast, in the prior art the 5,7-diene is first hydrogenated to the 7-ene, which then is rearranged to an 8(14)-ene by subjecting the 7-ene to different hydrogenation conditions. If desired, the intermediate 7-ene can be isolated by terminating the hydrogenation treatment at an appropriately early stage. The method of this reaction used for the conversion of 3-hydroxy-5,7-diene into 8(14)-enes is also simpler and less hazardous than the method employed by Laubach (supra) in which the 3-hydroxy-19-methyl-5,7-diene ergosterol is converted to the isomeric 6,8(14)-diene by treatment with liquid sulfur dioxide at 100° C. in a sealed tube. The method is further simpler than that described by Fieser and Fieser (supra) in which 3-hydroxy-5,7-dienes are first converted to the corresponding tosylates. Subsequent reactions afford 3α,5α-cyclo-6,8(14)-dienes which, according to transformations described by C. W. Shoppee, Chemistry of the Steroids, pp. 60 and 61 (1964), would yield 3-hydroxy-3,8(14)-dienes.

In the case of process (c) the 4,7-dien-3-ones used as starting materials are readily obtainable by base-acid treatment of the corresponding readily available 4,6-dien-3-ones. The 4,7-dien-3-ones are then catalytically hydrogenated and concomitantly rearranged to the corresponding 8(14)-enes, whereby, if desired, the intermediate 7-enes may be isolated. Reduction of the 4,7-dien-3-ones to the corresponding 4,7-dien-3-ol and subsequent hydrogenation provides an alternate route to the 8(14)-enes.

With regard to process (d) it is surprising that treatment with 14α-hydroxy-7-enes (IX) under hydrogenation conditions leads to virtually complete hydrogenolysis with concomitant rearrangement to the corresponding 8(14)-ene and to no observable hydrogenation of the 7-double bond of the allylic alcohol. In the case of the treatment of 14β-hydroxy-7-enes (IX) under hydrogenation conditions hydrogenolysis to the corresponding 8(14)-enes (I) is accompanied by hydrogenation to the corresponding 14β-alcohols as described herein.

In process (e), application of the above-disscussed treatment under hydrogenation conditions and the reduction methods would lead to the conversion of the compounds of formula (XI) to 8α- and 8β-hydroxy steroids as well as to conversion into 8(14)-enes via hydrogenolysis of the 8-hydroxy-6-ene grouping to 7-enes and subsequent rearrangement. Dehydration of the saturated 8-alcohols by conventional techniques would afford further 8(14)-enes. The 8(14)-enes would, depending on reaction conditions, either be 5α-hydrogen or 5β-hydrogen steroids.

The novel products of the present invention of formula (I) are very valuable as intermediates for the preparation of compounds of the formula

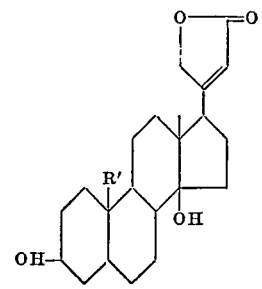

wherein R' is as defined above.

The use of such compounds and their glycosides for the treatment of cardiac insufficiency is well known, as for example disclosed in Angewante Chemie, vol. 9, No. 5, pp. 321–332. Conventionally, such 14β-hydroxycardenolides have been isolated from natural sources. Recently a number of 14β-hydroxycardenolides have also been obtained by synthesis using as key intermediates 14β-hydroxypregnan-20-ones or pregn-14-en-20-ones. These synthetic methods are, however, not economical and afford only cardenolides having a methyl group in position 10. In contrast, there have subsequently been developed novel methods for the preparation of valuable 3,14β-oxygenated precursors, to 14β-oxygenated cardenolides as described herein.

As is obvious to those skilled in the art, these precursors can readily be converted into the corresponding 14β-hydroxycardenolides by taking recourse to one or several of the well known previously developed methods for such conversions. The methods are distinguished by their simplicity and economy and also allow the preparation of variously functionalized carbenolides, such as, for example, 19-oxygenated cardenolides, 19-noncardenolides and unsaturated cardenolides. This functionalization makes it possible to bring about a medicinally desirable change in the kind and degree of cardiac activity. For example, studies on differently substituted cardenolides isolated from natural sources have shown that 19-oxygenated cardenolides are substantially more active than their 19-methylanalogs, as described in Fieser and Fieser, Steroids, chapter 20.

In greater detail, the compounds of the present invention in which Y is OH, are converted to the corresponding 14β-hydroxy analogues, introduction of the 14β-hydroxy group being accomplished by several methods. The above conversion may be depicted by the following scheme:

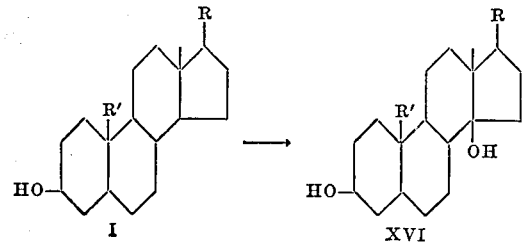

in which R and R' are as defined above.

The conversion of the group R in position 17 of the latter 3,14β-oxygenated precursors into the 17β-butenolide ring of the compounds of formula (XVI) may be carried out according to methods known to those skilled in the art, as for example summarized in Angewandte Chemie, vol. 9, No. 5, pp. 321–332. Thus, for instance, 14β-hydroxy-17β-acetyl as well as 14β-hydroxy-21-acetoxy-17β-acetyl steroids have been converted into 14β-hydroxy compounds having a butenolide ring in the 17β-position via initial transformtion into the corresponding 20-ethoxyacetylen-20-ol and successive acid treatment and oxidation with selenium dioxide in boiling benzene, as described by F. Sondheimer, Chemistry in Britain, vol. 1, No. 10, pp. 454–464 (1965). While in the above method the butenolide side chain is introduced subsequent to the introduction of the 14β-hydroxy group, in other methods, as for example, described in Angewandte Chemie (supra), the 17β-butenolide side chain is introduced into compounds not possessing a 14β-hydroxy group which is introduced in the final step.

With regard to the other groups in the 17β-position, as specified above for general formula (I), where the group R is

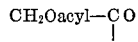

it may be converted into the butenolide ring by the method described above for the transformation of a 21-acetoxy-17β-acetyl steroid (R is

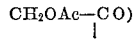

Where the group R is

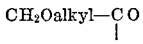

it may be first converted to a group R where it is

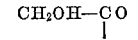

by conventional methods. Subsequent acetylation affords then the above 21-acetate (R is

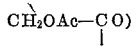

which then can be converted to the butenolide ring as described above. In the case where R is

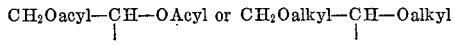

conversion of these groups by conventional methods into group R where it is

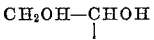

followed by selective acetylation in position 21 and subsequent oxidation of the 20-hydroxy group by the method described, for example, in F. Sondheimer, Chemistry in Britain, cited above, affords then a group R which is

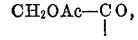

which may be converted to a butenolide ring according to the methods described above.

In the case where R is

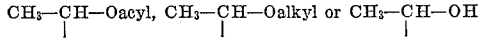

conventional procedures, such as used for the generation of hydroxy group from acylates and ethers respectively and subsequent oxidation, afford a 17β-acetyl group (where R is

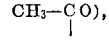

which may be converted to the butenolide ring by methods described above.

In the case where R is

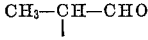

the 17β-butenolide ring may be formed by conventional cyanohydrin formation followed by dehydration and conversion of the α,β-unsaturated nitrile obtained into the corresponding α,β-unsaturated 23-carboxylic acid ethyl ester, again by conventional methods, and subsequent treatment with selenium dioxide in boiling benzene as described by F. Sondheimer, Chemistry in Britain, cited above. In the case where R is

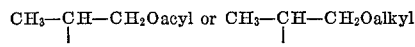

conversion to the corresponding 22-alcohol, where R is

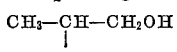

and oxidation to the above aldehyde, R being

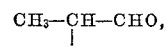

by conventional methods, may then afford the 17β-butenolide ring by the method described above. In the case where R is

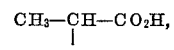

reduction of the carboxylic acid group to the above 22-aldehyde by conventional methods may then subsequently afford the 17β-butenolide ring by the method described above.

In the case where R is

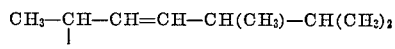

ozonolysis of the 20(22)-double bonds, as described, for example, by A. F. Daglish, J. Chem. Soc., pp. 2627–2633 (1954) affords then the above 22-aldehyde having R being

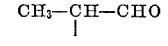

which may then be converted to the butenolide ring by the method described above.

In the case where R is CN, conventional transformation to the corresponding methyl ester, R being

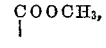

followed by conversion of the latter to a butenolide ring may be accomplished as described by F. Sondheimer, Chemistry in Britain, cited above. In the case where R is O= formation of the corresponding cyanohydrin followed by conventional dehydration and hydrogenation, affords R being CN which can be converted to the 17β-butenolide ring as described above. In the case where R is OH, —Oacyl or —Oalkyl conversion of these groups into compounds where R is O= by conventional methods followed by application of the methods described above also yields the 17β-butenolide ring.

Having thus generally described the invention, reference will now be made to the following examples, illustrating preferred embodiments.

EXAMPLE 1

A mixture of 5 g. of 19-hydroxy-17β-pivaloxyandrosta-4,6,8(14)-trien-3-one and 50 ml. of methanol was cooled below 5° C. by an ice-bath, whereupon 500 mg. of sodium borohydride was added slowly and with stirring. After 85 minutes another 50 mg. of sodium borohydride was added. The mixture was stirred with cooling for another 35 minutes, whereupon 10 ml. of acetic acid-water 1:10 was added dropwise. After 10 minutes of further stirring without external cooling 2 g. of sodium bicarbonate was added. The mixture was then concentrated at reduced pressure to a thick paste and 50 ml. of water was added. The precipitate obtained was filtered and digested with benzene to yield 3β,19-dihydroxy-17β-pivaloxyandrosta-4,6,8(14)-triene, UV max. 275 (sh), 285 and 300(sh) mμ.

EXAMPLE 2

A mixture of 3.1 g. 3β,19-dihydroxy-17β-pivaloxyandrosta-4,6,8(14)-triene, 319 ml. of ethyl acetate, 1.55 g. of palladium on charcoal (5%) and 155 ml. of 2% aqueous potassium hydroxide was agitated in an atmosphere of hydrogen for 16 hours, whereupon it was diluted with ethyl acetate and filtered through diatomaceous earth. The organic phase of the filtrate was then washed twice with 150 ml. of water and concentrated at reduced pressure in the presence of hexane. Subsequent filtration gave a white solid which was recrystallized from ether-petroleum ether to afford 3β,19-dihydroxy-17β-pivaloxy-5α-androst-8(14)-ene, UV max. 212 mu, m.p. 163–165° C. In a hydrogenation step, which was carried out as described above except that the potassium hydroxide was omitted, extensive formation of by-products took place, as shown by TLC comparison of the respective crude reaction products obtained after filtration of the reaction mixture and evaporation of the filtrate.

EXAMPLE 3

A mixture of 100 mg. 3β,19-dihydroxy-17β-pivaloxy-5α-androst-8(14)-ene, 1 ml. of dihydropyrane and 0.05 ml. of an acidic ethereal solution, prepared by saturating 20 parts of ether with one part of concentrated hydrochloric acid, was agitated until all material had dissolved and was then left to stand at room temperature for 16 hours, whereupon another 0.05 ml. of the acidic ethereal solution was added followed by still another 0.05 ml. of the acid solution after 20 hours. The mixture was then left to stand for an additional 18 hours, whereupon 5.0 ml. of 2% aqueous potassium hydroxide was added. Extraction with petroleum ether followed by evaporation gave a semi-solid consisting essentially of the 3,19-di-(tetrahydropyranyl) ether of the starting material, which was heated with 2.0 ml. of 2N methanolic potassium hydroxide at 72° C. for 16 hours under nitrogen. The mixture was then cooled at —5° C., filtered and the precipitate obtained was washed with 95% aqueous methanol to yield the 3,19-di(tetrahydropyranyl) ether of 3β,17β,19-trihydroxy-5α-androst-8(14)-ene, m.p. 179–180° C.

EXAMPLE 4

A mixture of 100 mg. of 3β,19-dihydroxy-17β-pivaloxyandrost-8(14)-ene, 1 ml. of dihydropyrane and 0.1 ml. of the acid ethereal solution, described in Example 3, was left to stand for 4 hours at room temperature, whereupon an excess of 10% aqueous potassium hydroxide was added. The ethereal phase was dried with sodium sulfate and concentrated in the presence of petroleum ether to give the di(tetrahydropyranyl) ether of the starting material after filtration as indicated by TLC.

EXAMPLE 5

A mixture of 40 mg. of 3β,19-dihydroxy-17β-pivaloxy-5α-androst-8(14)-ene, 0.16 ml. of pyridine and 0.08 ml. of acetic anhydride was left to stand under nitrogen for 16 hours whereupon 0.08 ml. of water was added. Subsequent evaporation at reduced pressure gave 3β,19-diacetoxy-17β-pivaloxy-5α-androst-8(14)-ene, as indicated by TLC comparison with a sample prepared according to Example 35, and by conversion into the corresponding 8β,14β-epoxide.

EXAMPLE 6

To a mixture of 4.5 g. of 19-hydroxyandrost-4,6,8(14)-trien-3,17-dione in 40 ml. of methanol, which was cooled externally by an ice-bath, was added 1.8 g. of sodium borohydride with stirring. Stirring was continued for 1 hour, 450 ml. of benzene was added and the mixture was concentrated at reduced pressure to a small volume. Benzene and a small volume of water was added and the mixture was concentrated again. Subsequent filtration and recrystallization of the precipitate from methanol gave 3β,17β,19-trihydroxyandrosta-4,6,8(14)-triene as a white solid, UV max. 275(sh), 285 and 298(sh) mμ.

EXAMPLE 7

A mixture of 3.65 g. of 3β,17β,19-trihydroxyandrosta-4,6,8(14)-triene, 360 ml. of methanol and 900 mg. of palladium on charcoal (5%) was shaken in an atmosphere of hydrogen, whereupon it was diluted with 1080 ml. of ethyl acetate and filtered through diatomaceous earth. Evaporation at reduced pressure gave a precipitate which was recrystallized from benzene to yield 3β,17β,19-trihydroxy-5α-androst-8(14)-ene as a white solid, UV max. 212 mμ.

EXAMPLE 8

A mixture of 500 mg. of 3β,17β,19-trihydroxyandrosta-4,6,8(14)-triene, 1.0 ml. of pyridine and 0.5 ml. of acetic anhydride was left to stand at room temperature for 16 hours in an atmosphere of nitrogen. Dilution with water, followed by extraction with ether and concentration at reduced pressure gave 3β,17β,19-triacetoxyandrosta-4,6,8-(14)-triene as a white crystalline product which was used for the reaction described in Example 9 below..

EXAMPLE 9

A mixture of 300 mg. of 3β,17β,19-triacetoxy androsta-4,6,8(14)-triene, 30 ml. of ethyl acetate, 30 ml. of 2% aqueous potassium hydroxide and 150 mg. of palladium on charcoal (5%) was agitated in an atmosphere of hydrogen for 16 hours, whereupon it was diluted with 180 ml. of ether and filtered through Celite. Evaporation of the filtrate gave a resin which was chromatographed on silica gel. Elution with ethyl acetate-benzene 1:50 gave 3β,17β,19-triacetoxy-5α-androst-8(14)-ene as a colorless resin, UV max. 212 mμ, which was characterized further as its 8β,14β-epoxide as described herein.

EXAMPLE 10

A mixture of 100 mg. of 19-hydroxy-20-pivaloxypregna-4,6,8(14)-trien-3-one, 300 mg. of lithium tri-t-butoxyaluminium hydride and 2 ml. of tetrahydrofuran was agitated for 3 hours at room temperature. The mixture was then concentrated in the presence of benzene and the gelatinous precipitate obtained was treated with 10% aqueous acetic acid. Extraction with ethyl acetate, followed by washing of the organic phase with water and evaporation at reduced pressure in the presence of hexane gave, after filtration, 3β,19-dihydroxy-20-pivaloxypregna-4,6,8(14)-triene, UV max. 275(sh), 286 and 299(sh) mμ; m.p. 162–163° C.

EXAMPLE 11

A mixture of 70 mg. of the product of Example 10, 7.0 ml. of ethyl acetate, 35 mg. of palladium on charcoal (5%) and 3.5 ml. of 2% aqueous potassium hydroxide was shaken in an atmosphere of hydrogen for 21 hours at room temperature, whereupon 14 ml. of ethyl acetate was added and the mixture was filtered through diatomaceous earth. Concentration of the filtrate at reduced pressure in the presence of hexane gave white plates of 3β,19-dihydroxy-20-pivaloxy-5α-pregn-8(14)-ene; UV max. 212 mμ; IR (KBr) 3500(sh), 3425, 3300(sh), 1730 and 1160 cm.$^{-1}$.

EXAMPLE 12

A mixture of 200 mg. 19-hydroxy-20-pivaloxypregn-4,6,8(14)-trien-3-one, 4 ml. of tetrahydrofuran and 400 mg. lithium tri-t-butoxyaluminium hydride was agitated under nitrogen at room temperature for 90 minutes, whereupon 200 mg. of additional lithium tri-t-butoxyaluminium hydride was added. The mixture was then agitated for another 30 minutes and 0.8 ml. of a 70% solution of sodium bis(methoxyethoxy)aluminium hydride in benzene ("Red-al") was added, followed after 10 minutes by an additional 0.4 ml. of the latter reagent. The mixture was then left to stand for 80 minutes and methanol was added gradually until an additional amount of methanol ceased to produce gas-evolution. The mixture was concentrated to a gel at reduced pressure in the presence of hexane, treated with 10% aqueous acetic acid and hexane, and filtered. The precipitate obtained was treated with ethyl acetate-methanol 20:1 and filtered. The filtrate was concentrated at reduced pressure and the residue obtained was digested with pentane. Filtration gave 3β,19,20-trihydroxypregna-4,6,8(14)-triene; UV max. 275(sh), 281 and 300(sh) mμ; IR (KBr) 3435, 3350, 3280(sh), 1575 and 1410 cm.$^{-1}$.

EXAMPLE 13

Hydrogenation of the product, prepared as described in Example 12, by the method outlined in Example 2 for the corresponding 17β-pivalate, afforded crude product, which after recrystallization from ether-hexane 1:1 gave 3β,19,20 - trihydroxy - 5α - pregn - 8(14) - ene; m.p. 207–209° C.

EXAMPLE 14

A mixture of 3 mg. of the above product (as described in Example 13), 0.06 ml. of pyridine and 0.05 ml. of a 5% solution of pivaloyl chloride in benzene was left to stand under nitrogen for 24 hours. Addition of water, followed by extraction with ether, extraction of the ethereal phase with 10% aqueous potassium hydroxide and water, and subsequent evaporation gave a resin, which, on treatment with methanol afforded a solid considered to be 20 - hydroxy - 3β,19 - dipivaloxy - 5α - pregn - 8-(14) - ene; IR (KBr) 3535, 1740, 1700, 1370 and 1125 cm.$^{-1}$.

EXAMPLE 15

A mixture of 200 mg. of 19 - hydroxy - 17β - pivaloxyandrosta - 4,6,8(14) - trien - 3 - one, 20 ml. of t-butylamine and 100 mg. of palladium on charcoal (5%) was agitated in an atmosphere of hydrogen for 7 hours at room temperature, whereupon the mixture was diluted with 60 ml. of ethyl acetate and filtered through diatomaceous earth. Evaporation of the filtrate gave a residue which, after several recrystallizations from petroleum ether-ether or petroleum ether-methylene chloride afforded 19 - hydroxy - 17β - pivaloxy - 5β - androst - 8-(14) - en - 3 - one; m.p. 153–154° C.

EXAMPLE 16

Hydrogenation of 2 mg. of 20 - pivaloxy - 19 - norpregna - 4,6,8(14) - trien - 3 - one resulted in (by the method of Example 15) a product was obtained having UV max. 210 mµ, which on the basis of its UV-spectrum and thin layer chromatogram, was considered to consist of 20 - pivaloxy - 5β - 19 - norpregn - 8(14) - en - 3 - one and its 5α-hydrogen isomer.

EXAMPLE 17

To a mixture of 500 mg. of 19 - hydroxyandrosta - 4,6-diene - 3,17 - dione and 2.5 ml. of dimethylsulfoxide was added with stirring and under nitrogen 500 mg. of sodium methoxide. After 40 seconds of stirring the basic mixture was added to 50 ml. of an aqueous solution consisting of 1 part of acetic acid and 10 parts of crushed ice; after 5 minutes of stirring under nitrogen, the mixture was filtered to yield 3,19 - dihydroxy - androsta - 3,5,7 - trien-17-one, UV max. 304(sh), 323 and 335(sh) mµ, as a light yellow precipitate which was dried for 30 minutes at high vacuum and was then used immediately for the next reaction.

EXAMPLE 18

A mixture consisting of half of the product obtained in Example 17 and 5 ml. methanol was cooled in an ice bath below 5° C. whereupon 250 mg. of sodium borohydride was added over a period of 6 minutes. The mixture was then concentrated at reduced pressure to a thick paste and then diluted with water; after standing at −5° C. for an hour it was filtered to yield 3β,17β,19 - trihydroxyandrosta - 5,7 - diene, UV max. 265(sh), 275, 285 and 297(sh) mµ.

EXAMPLE 19

A mixture consisting of the product obtained in Example 18, 0.4 ml. of acetic anhydride, and 0.8 ml. of pyridine was shaken for three days under nitrogen at room temperature whereupon 10 ml. of water was added. Extraction with ether, followed by extraction of the ethereal phase with water and evaporation at reduced pressure afforded a foam consisting of 3β,17β,19 - triacetoxyandrosta - 5,7 - diene, UV max. 263(sh), 272, 282 and 295 mµ.

EXAMPLE 20

A mixture consisting of the product obtained in Example 19, 8.0 ml. of ethylacetate and 40 mg. of palladium on charcoal (5%) was agitated in an atmosphere of hydrogen for 46 hours, whereupon 24 ml. of ether was added. The mixture was filtered through diatomaceous earth and the filtrate obtained was evaporated at reduced pressure to yield a product consisting mainly of 3β,17β,19-triacetoxy- - 5α - androst - 8(14) - ene, UV max. 210 mµ, as evidenced by TLC comparison with an authentic sample prepared by hydrogenation of 3β,17β,19 - trihydroxyandrosta - 4,6,8(14) - triene and subsequent acetylation.

EXAMPLE 21

A mixture consisting of 69 mg. of 3β,17β,19 - triacetoxyandrosta - 5,7 - diene, 7 ml. of ethylacetate and 14 mg. of palladium on charcoal (5%) was shaken in an atmosphere of hydrogen for two days whereupon it was diluted with 50 ml. of ether and filtered through diatomaceous earth. Evaporation of the filtrate at reduced pressure afforded a product consisting essentially of 3β,17β,-19 - triacetoxy - 5α - androst - 7 - ene as evidenced by TLC comparison with the corresponding isomeric 8(14)-ene, the isomeric 14-ene and the 5,7-diene used as the starting materials and also evidenced by UV spectroscopy.

EXAMPLE 22

A mixture consisting of the product obtained in Example 21 and 1.2 ml. of 2N methanolic potassium hydroxide was left to stand at room temperature under nitrogen for 20 hours, whereupon it was acidified with aqueous hydrochloric acid and filtered. The precipitate was treated with ethylacetate and water. Subsequent filtration afforded 3β,17β,19 - trihydroxy - 5α - androst - 7 - ene. IR (KBr) 3410, 3360, 3310, 1440, 1430, 1080 and 1040 cm.$^{-1}$.

EXAMPLE 23

A mixture of 200 mg. of 19 - hydroxy - 20 - pivaloxypregna-4,6-dien-3-one and 2.0 ml. of dimethylsulfoxide was stirred under nitrogen whereupon 400 mg. of sodium methoxide was added. The mixture was stirred for 35 seconds and then poured into 40 ml. of a vigorously stirred mixture consisting of 1 part of glacial acetic acid and 10 parts of crushed ice. After 30 minutes of stirring, the mixture was filtered to yield an off-white precipitate of 3,19 - dihydroxy - 20 - pivaloxypolgna - 3,5,7 - triene, UV max. 305(sh), 323 and 335(sh) mµ.

EXAMPLE 24

The freshly prepared product of Example 23 was added to 4.5 ml. of methanol which had been pre-cooled to −70° C. in a methanol-Dry Ice bath. The mixture was stirred and 150 mg. of sodium borohydride was added. The mixture was agitated at −70° C. for 15 minutes whereupon the Dry Ice bath was removed and the mixture was agitated without external cooling for 15 minutes. It was then poured into 45 ml. of hydrochloric acid-water 1:10. Extraction with ethylacetate, washing of the organic phase with water and evaporation gave a product consisting largely of 3,19 - dihydroxy - 20 - pivaloxypregna-5,7-diene, UV max. 276 and further mµ. This product was used without purification for the next reaction.

EXAMPLE 25

The product obtained in Example 24, 1.2 ml. of pyridine and 0.6 ml. of acetic anhydride was left to stand under nitrogen for 16 hours whereupon 30 ml. of water was added. Extraction with hexane, washing of the organic phase with water and evaporation gave a product consisting largely of the 3,19 - diacetate of the starting material. This product was used without further purification in the next reaction.

EXAMPLE 26

A mixture of the product obtained in Example 25, 15 ml. of ethylacetate and 175 mg. of palladium on charcoal (5%) was shaken for 3 days in an atmosphere of hydrogen; filtration through diatomaceous earth followed by evaporation of the filtrate gave a resinous product consisting essentially of 3β,19-diacetoxy - 20 - pivaloxy-5α- pregn-8(14)-ene, UV max. 210 mµ, which was used for the next reaction without further purification.

EXAMPLE 27

A mixture of the product obtained in Example 26, and 8.4 ml. of a solution consisting of 5 parts of benzene and 1 part of a 70% solution of sodium bis(methoxyethoxy) aluminium hydride in benzene was left to stand at room temperature for 3 hours, whereupon methanol was added dropwise until addition of 1 drop did no longer produce gas evolution. The mixture was then diluted with benzene and a small excess of aqueous hydrochloric acid was added. Extraction with ethylacetate, washing of the ethylacetate phase with water and evaporation gave a resin which on digestion with ether-petroleum ether and ether afforder 3β,19,20-trihydroxy - 5α - pregn-8(14)-ene as a white solid which had an IR spectrum identical to that of the product obtained in Example 13.

EXAMPLE 28

A mixture of 1 g. of 19 - hydroxy - 17β - pivaloxyandrosta-4,7-dien-3-one, 100 ml. of ethylacetate, and 0.5 g. of palladium on charcol (5%) was agitated in an atmosphere of hydrogen for 150 minutes, whereupon 300 ml. of ether was added. The mixture was filtered through diatomaceous earth and the filtrate was evaporated at reduced pressure. Chromatography on silica gel yielded, on elution with ethyl acetate-benzene 1:4, a fraction which on recrystallization with ether-petroleum ether gave 19-hydroxy - 17β - pivaloxy - 5α - androst-8(14)-ene, m.p. 126–126.5° C. as well as a more polar fraction which after recrystallization from ether-petroleum ether gave 19 - hydroxy - 17β - pivaloxy - 5β - androst-7-en-3-one, m.p. 163–163.5° C. Both compounds obtained were further characterized and identified by IR and NMR spectroscopy. TLC analysis showed that the hydrogenation to 19-hydroxy - 17β - pivaloxy - 5α - androst - 8(14) - en-3-one proceeds via 19-hydroxy - 17β - pivaloxy-5α-androst-7-en-3-one. TLC analysis indicated also that on prolongation of the hydrogenation to several days the 3-ketones are reduced further to the corresponding 3-alcohols.

EXAMPLE 29

A mixture of 10 mg. of 19-hydroxy - 17β - pivaloxy-5α-androst - 8(14) - ene-3-one, 20 mg. of lithium tri-tertiary-butoxy-aluminum hydride and 0.25 ml. of tetrahydrofurane was left to stand at room temperature with occasional shaking for 2½ hours whereupon benzene was added and the mixture was evaporated at reduced pressure to yield a gelatinous residue which was treated with hydrochloric acid-water 1:10 and then extracted with ethyl acetate. The organic phase was washed with water and was then evaporated in a stream of nitrogen. The solid obtained was recrystallized from ether-petroleum ether to yield 3β,19-dihydroxy - 17β - pivaloxy - 5α - androst - 8(14) - ene-3-one, m.p. 164–164.5° C. which had an IR spectrum identical to the product obtained in Example 2.

EXAMPLE 30

To a mixture consisting of 10 mg. of 19-hydroxy-17β-pivaloxyandrosta - 4,7 - diene - 3 - one and 0.2 ml. of methanol, which was cooled by an ice-bath, was added 1 mg. of sodium borohydride. The mixture was left to stand for 30 minutes whereupon 2 mg. of palladium on charcoal (5%) was added. The mixture was shaken in an atmosphere of hydrogen for 1 hour and was then diluted with ether; filtration through diatomaceous earth followed by evaporation of the filtrate at reduced pressure and treatment of the residue with pyridine acetic anhydride 2:1 for 16 hrs. then by dilution with water and extraction with ether afforded a material on evaporation of the ethereal phase which contained 3β,19 - diacetoxy-17β-pivaloxy - 5α - androst-8(14)-ene as shown by TLC comparison with an authentic sample.

EXAMPLE 31

A mixture of 3 g. of 19-hydroxy-17β-pivaloxyandrosta-4,6,8(14)-trien-3-one, 6.0 ml. of pyridine and 3.0 ml. of acetic anhydride was left to stand under nitrogen for 1 day, whereupon 3 ml. of water was added with external cooling. After standing for approximately 1 hour, the mixture was diluted with 90 ml. of water and then extracted with 180 ml. of ether. The ethereal phase was washed several times with water and then evaporated to yield a foam consisting essentially of the 19-acetate of the starting material, indicated by TLC. The product was used without further purification in the subsequent reaction described in Example 32.

EXAMPLE 32

The product obtained in the reaction described above in Example 31, 3 g. of meta-chloroperbenzoic acid, and 2,700 ml. of carbon tetrachloride was left to stand under nitrogen at room temperature for 3 days, whereupon the reaction mixture was extracted three times with 100 ml. of 2% aqueous potassium hydroxide and then once with 100 ml. of water. Drying with sodium sulfate followed by evaporation at reduced pressure gave a foam consisting essentially of 19-acetoxy - 8α,14α - oxido - 17β - pivaloxyandrosta-4,6-dien-3-one which was used without further purification in the subsequent reaction described in Example 33. In a different run, using 660 mg. of the starting material, the foam obtained as the crude product was chromatographed on silica gel. Elution with ethyl acetate-benzene 1:4 gave a purified sample of 19-acetoxy-8α,14α-oxido - 17β - pivaloxyandrosta - 4,6 - dien-3-one, UV max. 285 mµ, the structure of which was verified by NMR-spectroscopy.

EXAMPLE 33

A mixture of the crude product obtained in Example 32 and 150 ml. of methanol was cooled externally below 5° C. by an ice bath, whereupon 300 mg. of sodium borohydride was added over 2 minutes with stirring. After 10 minutes, the mixture had UV max. 246 mµ, thus indicating the presence of 19-acetoxy - 3β - hydroxy-8α,14α-oxido-17β - pivaloxyandrosta - 4,6 - diene. After 20 minutes reaction time, 60 mg. of palladium on charcoal (5%) was added and the mixture was shaken in an atmosphere of hydrogen for 16 hours, whereupon 550 ml. of ether was added and the mixture was filtered through diatomaceous earth. The filtrate which had UV max. 212 mµ, was evaporated at reduced pressure and the residue obtained was treated with hexane. Filtration gave a product containing 19 - acetoxy - 3β,14α - dihydroxy - 17β - pivaloxy - 5α-androst-7-ene which was left to stand with 5.26 ml. of acetic anhydride and 10.52 ml. of pyridine under nitrogen for 16 hours. Addition of 52.6 ml. of water followed by extraction with ether, washing of the ethereal phase with water and evaporation gave a foam which was chromatographed on silica gel. Elution with ethyl acetate-benzene 1:4 gave two fractions: the less polar fraction when recrystallized from hexane, gave 3β,19-diacetoxy-17β-pivaloxy - 5α - androst-8(14)-ene, m.p. 115–115.5° C. which had an IR spectrum identical to that of the product obtained in Example 35. Treatment of the more polar fraction with hexane gave after filtration 3β,19-diacetoxy-14α-hydroxy-17β-pivaloxy - 5α - androst-7-ene, m.p. 162–164° C. This product was characterized and its structure was verified by its IR and NMR spectrum.

EXAMPLE 34

A mixture of 4 mg. of 3β,19-diacetoxy-14α-hydroxy-17β-pivaloxyandrost-7-ene, 2 mg. of palladium on charcoal (5%) and 0.4 ml. of methanol was agitated in an atmosphere of hydrogen for 16 hours, whereupon 4 ml. of ether was added and the mixture was filtered through Celite. Evaporation gave a product consisting essentially of 3β,19 - diacetoxy-17β-pivaloxyandrost-8(14)-ene as shown by TLC comparison with the product obtained in Example 33.

EXAMPLE 35

A mixture of 500 mg. of 3β,19-diacetoxy-8β,14β-oxido-17β-pivaloxy-5α-androstane (for its preparation from 19-hydroxy - 17β - pivaloxyandrosta - 4,6,8(14)-trien-3-one (the subsequent description)), 250 mg. of palladium on charcoal and 50 ml. of acetic acid was shaken in an atmosphere of hydrogen for 45 hours whereupon 250 ml. of ether was added and the mixture was filtered through diatomaceous earth. The filtrate was cooled in an ice bath and 125 ml. of 50% aqueous potassium hydroxide was added slowly. The ethereal phase was washed several times with water and concentrated in the presence of hexane. Filtration followed by evaporation of the filtrate and chromatography of the residue obtained on silica gel gave, on elution with ethylacetate-benzene 1:4, 3β,19-diacetoxy-17β-pivaloxy-5α-androst-8(14)-ene, m.p. 115–117° C. which was characterized and the structure of which was verified by IR and mass spectroscopy.

EXAMPLE 36

A mixture of 2 mg. of 3β,19-diacetoxy-14β-hydroxy-17β-pivaloxy-5α-androst-7-ene, 1 mg. of palladium on charcoal (5%) and 0.2 ml. of acetic acid was shaken in an atmosphere of hydrogen for 20 hours, whereupon it was worked up as described in the procedure of Example 35. The product obtained contained 3β,19-diacetoxy-17β-pivaloxy-5α-androst-8(14)-ene as shown by TLC.

EXAMPLE 37

A mixture of 500 mg. of 3β,19-dihydroxy-20β-pivaloxy-5α-pregn - 8(14) - ene, 5.5 ml. of benzene-dihydropyrane 3.4:1.6 and 5.0 ml. of benzene-phosphorus oxychloride 100:1 was stirred under nitrogen. After some stirring all material had dissolved; after approximately 150 minutes 15 ml. of 4% of sodium bicarbonate was added, followed by 20 ml. of pentane. The mixture was extracted twice with water and the solvents were evaporated at reduced pressure. The resulting resin was dried at high vaccum and dissolved in a small amount of methylene chloride. The methylene chloride was replaced by pentane by repeated concentration to a small volume and addition of the latter solvent. The turbid solution was filtered through Celite and the clear filtrate was concentrated at reduced pressure yielding 888 mg. of a resin consising of 3,19-ditetrahydropyranyl ether of the 3β,19-diol used as the starting material, as evidenced by TLC-analysis.

A mixture of the latter product and 10 ml. of a solution consisting of 5 volumes of benzene and 1 volume of a 70% solution of sodium bis(methoxyethoxy) aluminium hydride in benzene, was stirred under nitrogen for 45 minutes whereupon 0.5 ml. of 1% aqueous sodium bicarbonate was added dropwise. The mixture was then concentrated at reduced pressure and ethyl acetate was added. Filtration through diatomaceous earth followed by concentration at reduced pressure gave 803 mg. of a resin consisting of the 3,19-ditetrahydropyranyl ether of 3β,19,20β-trihydroxypregn-8(14)-ene as evidenced by TLC analysis.

A stirred solution of 640 mg. of the latter product in 10 ml. of pyridine was cooled externally by an ice-bath and protected by a nitrogen atmosphere, whereupon 560 mg. of chromium trioxide was added slowly during 4 minutes. After 1 hour of stirring the ice-bath was removed, after 4 hours of stirring 0.56 ml. of isopropanol was added. Stirring was then continued for 30 minutes, whereafter 20 ml. of methylene chloride and approximately 1 g. of neutral aluminium oxide was added. The mixture was then filtered through approximately 3 g. of neutral aluminium oxide and the filtrate was concentrated at reduced pressure to a brown resin; the resin was dissolved in methylene chloride-benzene, the methylene chloride was removed by concentration and dilution with additional benzene, charcoal was added and the mixture was filtered through diatomaceous earth. Evaporation at reduced pressure gave the 3,19-ditetrahydropyranyl ether of 3β,19-dihydroxy-5α-pregn-8(14)-en-20-one as an amber resin; IR (CCl$_4$) 1705 cm.$^{-1}$, and as further evidenced by TLC analysis and conversion to 3β-acetoxy-8,19-oxido-5α-pregn-8(14)-en-20-one, described in the two subsequent examples.

EXAMPLE 38

A mixture of 2.2 g. of 3β,19-dihydroxy-5α-pregn-8(14)-en-20-one 3,19 - di(tetrahydropyranyl ether), 11.0 ml. of glacial acetic acid and 11.0 ml. of water was concentrated slowly to about one-half of its original volume at reduced pressure while being heated externally by a water bath having a temperature of 75° C., whereupon 11.0 ml. of glacial acetic acid-water 1:1 was added. The concentration and addition of glacial acetic acid-water 1:1 was repeated twice. Five volumes of water and 5 volumes of methylene chloride were then added, followed slowly by an excess of aqueous sodium bicarbonate. The methylene chloride extract was evaporated at reduced pressure, the resin obtained was redissolved in methylene chloride and a small proportion of material was precipitated by addition of hexane. The resinous precipitate was removed by filtration through Celite and the filtrate was concentrated at reduced pressure with intermittent addition of pentane and ether yielding 552.7 mg. of a solid precipitate of 3β,19-dihydroxy-5α-pregn-8(14)-en-20-one, IR (Nujol) 3470, 1728, 1680; 1275, 1243, 1195, 1088, 1045 and 1028 cm.$^{-1}$.

EXAMPLE 39

A mixture of 500 mg. of 3β,19-dihydroxy-5α-pregn-8(14 - en-20-one 19-tetrahydropyranyl ether, 1.0 ml. of acetic anhydride and 2.0 ml. of pyridine was left to stand in an atmosphere of nitrogen at room temperature for 16 hours, whereupon 30 ml. of water and 60 ml. of ether were added. The ethereal solution was extracted three times with 15 ml. of water and then evaporated at reduced pressure yielding a resinous material, which solidified partly after standing at −5° C., and consisted essentially of 3β,19-dihydroxy-5α-pregn-8(14)-en-20-one 3-acetate 19-tetrahydropyranyl ether. A mixture of 103 mg. of the latter material and 0.5 ml. of glacial acetic acid-water 1:1 was then evaporated seven times to one-half of its volume with a stream of nitrogen and with intermittent addition of acetic acid-water 1:1. It was then evaporated to dryness with nitrogen and by frequent addition of water, yielding a resin, which after treatment with pentane and filtration gave 18.5 mg. of 3-acetoxy-19-hydroxy-5α-pregn-8(14)-en-20-one, IR (Nujol) 3470, 1728, 1680, 1275, 1243, 1195, 1088, 1045 and 1028 cm.$^{-1}$.

EXAMPLE 40

A mixture of 194 mg. of the 3,19-ditetrahydropyranyl ether of 3β,19-dihydroxy-5α-pregn-8(14)-en-20-one, 1.94 ml. of acetic anhydride, 1.94 ml. of acetic acid and 0.194 ml. of pyridine was heated under nitrogen for 3 hours at 70° C., whereupon it was concentrated at reduced pressure to a resin with the help of toluene. TLC analysis and the subsequent reactions described below indicated that the product obtained consisted essentially of the 19-tetrahydropyranyl ether of 3β-acetoxy-19-hydroxy-5α-pregn-8(14)-en-20-one.

A mixture of 150 mg. of the later product and 3.0 ml. of glacial acetic acid-water 5:1 was heated at +70° C. for 3 hours, whereupon it was concentrated at reduced pressure to a resin. TLC analysis and the subsequent reaction indicated that the compound consisted essentially of 3β-acetoxy-19-hydroxy-5α-pregn-8(14)-en-20-one.

A mixture of 20 mg. of the latter product, 0.4 ml. of pyridine, 15.3 mg. of pyridinium hydrobromide perbromide was stirred at room temperature under nitrogen for 160 minutes whereupon 1.0 ml. of 0.5% aqueous sodium bisulfite and 2 ml. of ether was added. The ethereal phase was extracted twice with 0.5 ml. of water and was then concentrated at reduced pressure to a resin with the help of toluene to remove residual pyridine. Chromatography of the resin on glass plates coated with silica gel G gave, on elution with ethyl acetate-benzene 1:6, and digestion of the chromatographed material with pentane gave 3β-acetoxy - 8,19 - oxido-5α-pregn-14-en-20-one, IR (KBr) 3075, 1730, 1690, 1265, 1245, 1215, 1110, 1030, 1005, 927, 920, 885, 860, and 820 cm.$^{-1}$.

EXAMPLE 41

To a mixture of 17 mg. of lead tetraacetate and 0.19 ml. of benzene was added a mixture of 10 mg. of 3β,19-diacetoxy-5α-pregn-8(14)-en-20-one in 0.19 ml. of benzene, followed by a mixture of 0.018 ml. of methanol and 0.056 ml. of boron trifluoride etherate. The mixture was stirred magnetically for 4 hours, whereupon it was diluted with ether and extracted several times with water. Evaporation gave resin consisting essentially of 3β,19,21-triacetoxy-5α-pregn-8(14)-en-20-one, as evidenced by TLC analysis.

EXAMPLE 42

A mixture of 20 mg. of 3β,19-dihydroxy-5α-pregnan-20-one 3,19-ditetrahydropyranyl ether and 0.1 ml. of acetic acid-water 5:1 was evaporated to one-half of its volume with a stream of nitrogen while being heated by an oil bath which was kept at a temperature of 84° C. The lost volume of mixture was reconstituted by addition of acetic acid-water 5:1. The process of evaporation and addition was then repeated 4 times whereuopn the mixture was evaporated at room temperature. Digestion with pentane gave 5.6 mg. of a precipitate of 3β,19-dihydroxy-5α-pregnan-8(14)-ene-20-one, as evidenced by TLC analysis.

EXAMPLE 43

To a mixture, heated by both having a temperature between 70–80° C. of 5 mg. of 3β-acetoxy-19-hydroxy-5α-pregn-8(14)-en-20-one 19 - tetrahydropyranyl ether, 0.5 ml. of acetic acid and 0.125 ml. of water was added 50 mg. of zinc dust with mechanical stirring. After one hour of stirring a second lot of 50 mg. of zinc was added. After a further hour of stirring the mixture was evaporated at room temperature at reduced pressure, treated with ether and water and filtered. The organic phase of the filtrate was washed with water and evaporated at reduced pressure to yield a resin, which was digested with pentane to yield a solid consisting essentially of 3β-acetoxy-19-hydroxy-5α-pregn-8(14)-en-20-one, as evidenced by TLC analysis.

There will now be described further embodiments of this invention.

More particularly, one aspect of this invention relates to novel processes for preparing compounds of formula (I). According to a still further aspect of the present invention, there are provided novel chemical compounds of the formula (Ia) useful as intermediates in the preparation of other compounds which may, in turn, be used in valuable starting materials for the production of pharmaceutically active compounds.

From the literature, it is reported in the J.O.C. (J. Elks), 468 (1954) and from J.C.S. (P. Bladon), 2176 (1955) and as well J.C.S. (P. Bladon and T. Sleigh), 6991 (1965), and in addition from J.O.C. (W. F. Johns), 31, 3780 (1966), that certain 10α- and 10β-methyl as well as 10β-hydrogen steroids can be converted to the corresponding 4,6,8(14)-trien-3-ones. The methods used to employ such triene compounds involve long and complicated chemical reaction routes and result in low yields of the end products. In addition, certain of these techniques employ starting materials which are not readily available.

Briefly summarized, the above prior art techniques may be grouped into three different types of processes: (a) converting 5,7-dien-3-ol acetates to the corresponding 5,8-peroxides which may then be further converted to the corresponding 8-hydroxy-4,6-dien-3-ones, which upon dehydration yield the corresponding above-mentioned triene compounds; (b) converting the alcohols, instead of the acetates of (a), into the above-mentioned trienones by treatment with para-benzoquinone and aluminum tert.-butoxide, there is obtained the above-mentioned triene compounds; and (c) converting 4,8(14)-dien-3-ones into the corresponding above-mentioned trienes by treatment with a dehydrogenating agent. In the case of method (a), the process involved is complicated and the overall yield of triene is very low. In the case of method (b), starting from the alcohols, the yields are extremely low (in the order of about 5%); while in the case of method (c), the steroidal dienes used as starting materials are only difficultly obtainable.

In accordance with one aspect of the present invention, the novel products have formula (Ia) as follows:

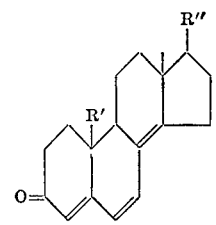

(Ia)

wherein R″ is selected from the group consisting of

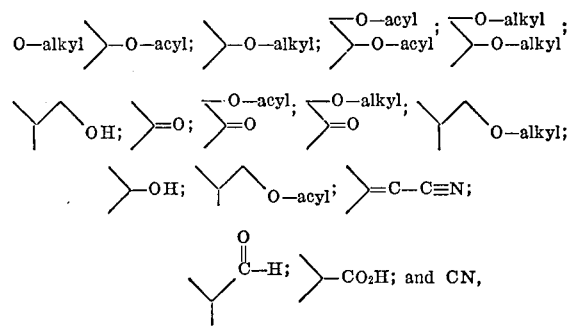

wherein alkyl is tetrahydropyranyl, lower alkyl, preferably methyl, or a substituted methyl wherein the substituent is selected from the group consisting of phenyl, halogen, preferably chlorine and bromine, methoxy, $CH_2=CH$ and $HC\equiv C$; acyl represents a group selected from those consisting of acetate, trilower-alkyl acetates wherein the lower alkyl group is preferably methyl or ethyl, monohalo acetates and trihalo acetates, preferably wherein the halogen is chlorine and bromine, and $R_2$ is $CH_3$; $CH_2OH$; $CH_2$—O—CO—NH—C($CH_3$)$_3$; $CH_2OCOCH_3$; CHO and H.

In accordance with a further aspect of this invention, there are provided processes for preparing the above compounds, and in general those of formula (I);

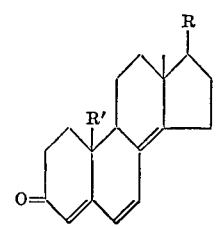

(I)

wherein R is selected from the group consisting of

O-acyl or O-alkyl; OH; O; >—O-acyl; >—O-alkyl;

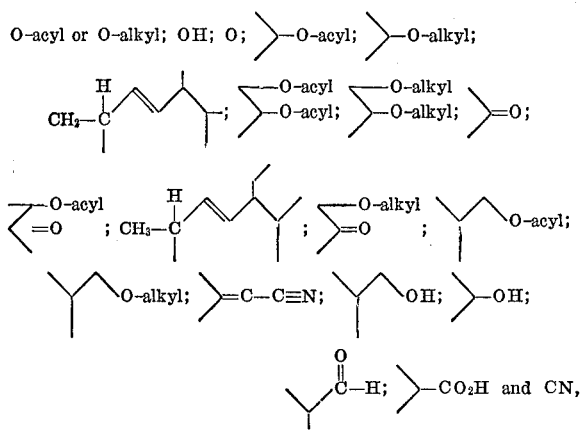

wherein alkyl, acyl and R' is as defined above.

Briefly summarized a process according to the present invention is selected from the group consisting of:

(1) Treating a member selected from the group consisting of compounds having the formulae (II); (III); (IV) and (V) with a base, and subsequently treating the basic mixture obtained with a dehydrogenating agent and a weak acid to obtain a compound of the formula (I). The reaction may be exemplified by the following equation;

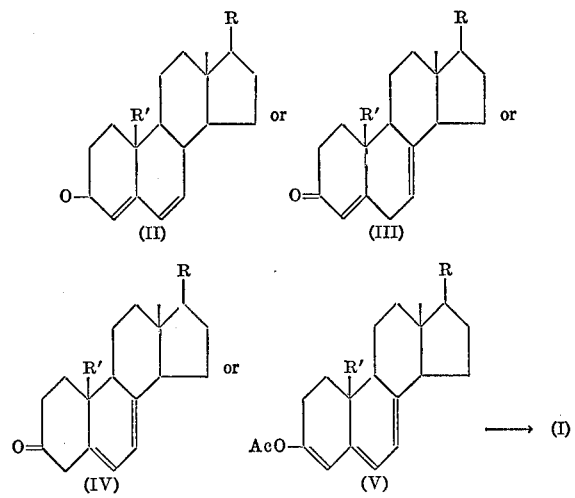

wherein R and R' are as defined above;

(2) Reacting a compound of the formula (III); (IV); or (V) with a dehydrogenating agent to yield a compound of the formula (I) according to the following equation:

wherein R and R' are as defined above; wherein R''' is AcO or OH;

(3) Treating a compound of the formula (VI) with ferric chloride and methanol to form a compound of formula (VII), and thereafter treating the latter compound with a strong mineral acid to yield a compound of (I), as exemplified by the following equation:

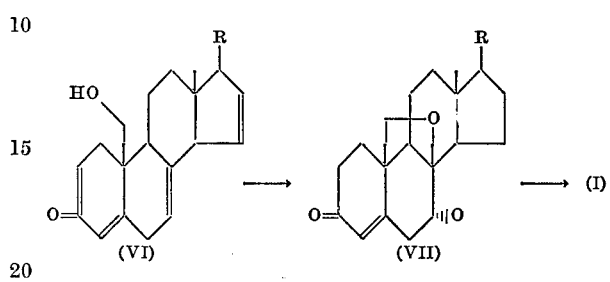

wherein R is defined above and Y is methyl;

(4) Treating a compound of the formula (VI) with a peracid to form a mixture of compounds having the formulae (VIII) and (VII) (wherein Y is H), and if desired, separating the compound of the formula (VII) from said reaction mixture, and if desired, acetylating the 7-hydroxy compound (VII) to a 7-acetoxy compound of formula (VII) wherein Y=COCH₃; thereafter treating the separated 7-hydroxy compound or the mixture of the latter and compound (VIII) or the 7-acetate (VII) with a strong mineral acid to form a compound of formula (I) according to the following equation:

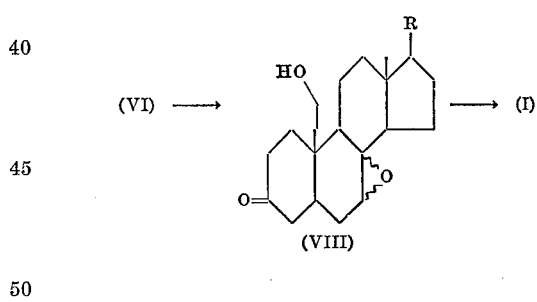

where R is defined above;

(5) Treating a compound of the formula (VIII) with a base to obtain a compound of the formula (IX) and the corresponding 8α-hydroxy compounds of the formula (X) and subjecting the products obtained to treatment with

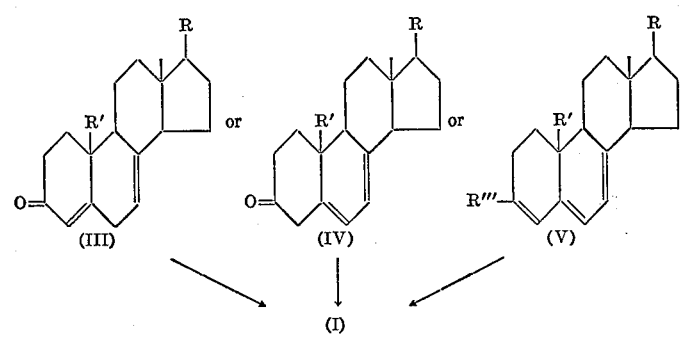

a dehydrating agent to yield a compound of formula (I), according to the following equation:

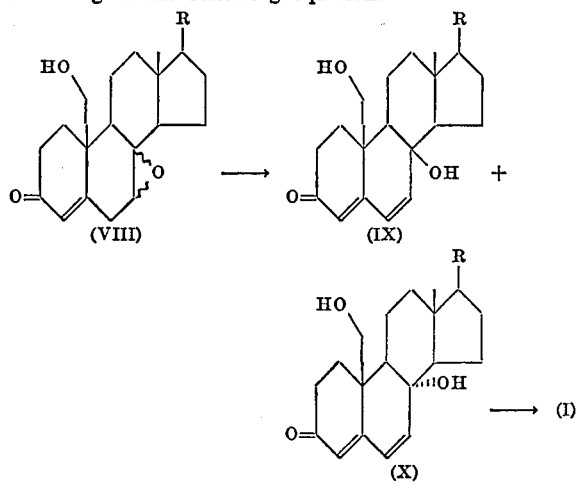

wherein R is as defined above;

(6) Reacting a compound of the formula (XI) with a peracid to yield a compound of the formula (XII), thereafter treating the latter compound with a base to yield a compound of the formula (X) and then treating this compound with a dehydrating agent to yield a compound of the formula (I); all according to the following equation:

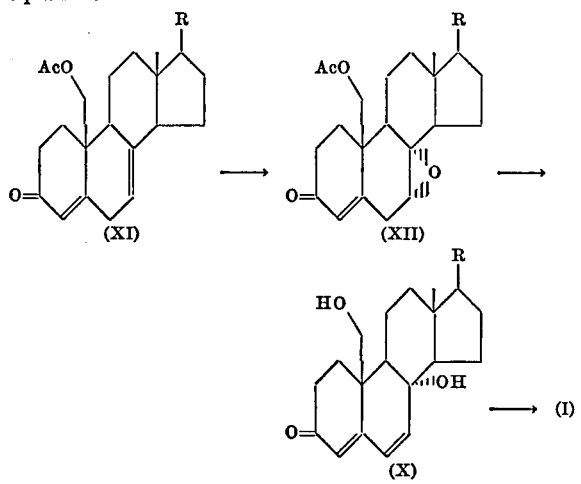

wherein R is as defined above; and (7) Treating a compound of the formula (XIII) with a peracid to yield a compound of the formula (XIV), reacting the latter compound with a base to yield a compound of the formula (XV) and thereafter dehydrating the later to yield a corresponding compound of the formula (I), according to the following equation:

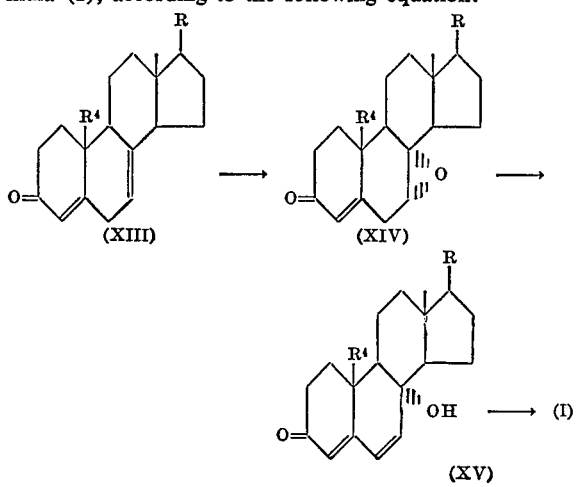

wherein $R^4$ is H; $CH_3$; or $CH_2$—O—CO—NH—$C(CH_3)_3$ and R is as defined above.

In greater detail, a preferred procedure for process (1) of the present invention is to employ an alkali metal alkoxide, or an alkali metal hydroxide; typical examples of which are soidum methoxide, sodium ethoxide, potassium tertiary butoxide, soidum hydroxide, potassium hydroxide, etc. Preferably the treatment with the base is carried out at approximately room temperature, although higher and lower temperatures may be employed if desired. The reaction is preferably carried out in the presence of an aprotic polar solvent, typical examples of which are dimethylsulfoxide, and other alkylsulfoxides, etc. It is most desirable to carry out the treatment of compound (II) with the base in the presence of an inert atomsphere, such as a nitrogen atmosphere, in order to exclude aerial oxidation; however, this is not essential if the base treatment is carried out for a short duration only.

The acid and dehydrogenating treatments of the resulting basic mixture can be carried out at or below room temperature preferably below 0° C. The above treatment with acid and dehydrogenating agent may also be carried out in the presence of a solvent, which may or may not be the same solvent used for the alkali treatment initially. Preferably, however, a water immiscible solvent is employed, such as ethyl acetate or ether, etc. As the acid employed, weak acids such as acetic acid, formic acid, propionic acid, as well as weak inorganic acids such as phosphoric acid, phosphonic acid, sulphorous acid, etc. may be employed. As the dehydrogenating agent, there may be employed various compounds such as dichlorodicyanoquinone, chloranil, benzoquinone, manganese dioxide, etc. The weak acid and the dehydrogenating agent may be suitably employed as a mixture of these ingredients in the solvent, or alternately, the basic mixture may first be treated with the acid and subsequently with the dehydrogenating agent.

The compounds of the formula (II) used as the starting materials for this reaction are known in the art, and reference may be had to "Steroids," vol. 1, 1963, p. 233 et seq., Fieser and Fieser, Steroids, p. 555 (1959), Steroids, 1, 233 (1963), J.O.C., 29, 60 (1964), Experientia, vol. 18, 1962, p. 464.

Process (2) of the present invention involving the dehydrogenation of compounds of formulae (III) to (V) into the corresponding compounds of formula (I) may be carried out at between room temperatures to elevated temperatures. The dehydrogenation is preferably carried out in an inert solvent, and any suitable solvent may be employed for this purpose. To this end, typical of the solvents which may be employed in the process of the present invention, are toluene, xylene, benzene, tretiarybutanol, etc. The dehydrogenating agent may be any suitable agent, typical agents being those mentioned above with respect to process (1). The compouds of formulae (III) and (V) are known in the art and are described in Fieser and Fieser, Steriods, p. 111 (1959), J.O.C., 17, 134 (1952), and Tetrahedron Letters, No. 8, 387 (1964).

In carrying out process (3) according to the present invention, the first stage of converting a compound of the formula (II) wherein R' is $CH_2OH$, into a compound of the formula (VII) may be carried out at room temperature, preferably in the presence of an inert solvent. Preferably the reaction is carried out under anhydrous conditions employing anhydrous solvents and reagents for the same reason.

The treatment of the compound (VII) to yield a compound of formula (I), is preferably carried out with a strong mineral acid, such as hydrobromic acid, perchloric acid, hydrochloric acid, etc. The reaction may be carried out in the presence of an inert solvent, a typical solvent being, for example, ether or ethyl acetate. The reaction may expediently be carried out at room temperature, or elevated temperature may be employed, if desired.

Carrying out process (4) of the present invention as described above, a compound of formula (VI) is treated with a peracid preferably in the presence of a solvent. Typical solvents include, for example, carbon tetrachloride, benzene, hexane, methanol, etc. Reaction temperatures may range from below to above room temperature. The peracid employed in this reaction may be any suitable peracid, typical examples being perbenzoic acid, metachloroperbenzoic acid, peracetic acid, trifluoroacetic acid, etc. The starting materials employed in this reaction are a species of the formula (III) and may be prepared as described above with respect to such compounds.

The product resulting from the above-described reaction may consist of a mixture of a compound of the formula (VII), wherein the radical Y is H, with the compound of the formula (VIII) from which there may be separated, if desired, the compound of formula (VII), which may be converted to a compound of the formula (I) by treatment with a mineral acid as described above with respect to the conversion of a compound of the formula (VII) according to process (3) of the present invention. If the mixture is not separated, the total mixture of compounds of the formulae (VII) and (VIII) may be treated with a strong mineral acid as described with respect to process (3) of the present invention, to form the corresponding compound of formula (I).

If desired, the compound of formula (VII) separated from the reaction mixture of compounds of the formulae (VII) and (VIII) may be acetylated by conventional means using conventional acetylating agents, such as for example, acetic anhydride, pyridine, etc.; whereupon there is obtained a compound of formula (VII) in which the radical Y is the acetyl group. This latter compound may then be converted into a compound of the formula (I) by treatment with mineral acid as described in process (3) hereinabove.

In carrying out process (5) according to the present invention, the compound of the formula (VIII) separated from the above-described mixture of compounds of formulae (VII) and (VIII) may be treated with a base, such as for example, sodium hydroxide, potassium hydroxide, sodium carbonate, etc. preferably in a solvent such as an alcoholic solvent—e.g. ethanol, methanol, etc. to form a mixture of a compound of the formula (IX) and its α-isomer of formula (X). The mixture may be separated into the respective isomers, if desired, and those isomers subsequently subjected to a dehydrating agent, or alternatively, both isomers forming the mixture may be treated. The dehydration may be carried out according to conventional techniques and procedures well known to those skilled in the art.

The process of the present invention described under (6) above may be carried out by treating a compound of the formula (XI) with a peracid using, for example, the reagents and conditions described with respect to process (4) above, whereupon a compound of the formula (XII) is obtained. Compound (XII) may then be treated with a base as described likewise in process (5) for the conversion of the compound of the formula (VIII) to compounds of formulae (IX) and (X), whereupon there is obtained the α-isomer of the formula (X). Thereafter, this α-isomer may be treated as described above with respect to process (5) with a dehydrating agent according to conventional procedures and techniques to obtain a compound of the formula (I) or (Ia).

The compounds of the formula (XI) are a species of the compounds of the formula (III) and may be prepared as described above.

As outlined above with respect to process (7), a compound of the formula (XIII) is initially subjected to treatment using a peracid as, for example, the peracids described with respect to process (4) to yield a compound of the formula (XIV). The latter compound may then be treated with a base such as those described in connection with process (5) (wherein a compound of the formula (VIII) is converted to a mixture of compounds of formulae (IX) and (X)) thereby to obtain a compound of the formula (XV), which may be treated with a dehydrating agent according to conventional procedures and techniques to obtain a compound of the formula (I). One of the starting materials used in this process (7) may be obtained by treating a compound of the formula (III) with tertiary-butyl isocyanate at an elevated temperature (e.g. at about 100° C.) whereupon the compound of the formula (III), wherein R' is $$CH_2-O-CO-NH-C(CH_3)_3,$$

is obtained; the others may be obtained as described with respect to compound III.

I claim:

1. A steroid compound of the formula

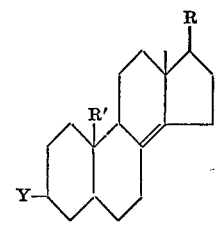

wherein R is selected from the group consisting of

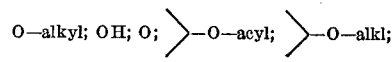

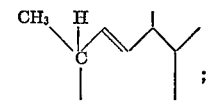

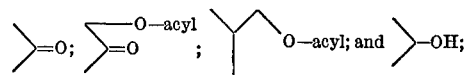

wherein alkyl is tetrahydropyranyl or lower alkyl; wherein acyl represents a group selected from those consisting of acetate, lower trialkyl acetates, monohalo acetates and trihalo acetates, wherein Y is selected from the group consisting of O=, HO—, O-alkyl and O-acyl, and wherein R' is chosen from the group of H, $CH_2OH$, $$CH_2-O-CO-NH-C(CH_3)_3,$$

$CH_2Oalkyl$ and $CH_2Oacyl$, wherein alkyl and acyl are defined as above.

2. The product of Claim 1 wherein in the R substituent, when the group is lower alkyl, it is methyl.

3. The product of Claim 1, wherein the alkyl substituent of the lower trialkyl group is methyl or ethyl.

4. The product of Claim 1 wherein the halogen substituent of the monohalo acetate or trihalo acetate group is chlorine, fluorine, or bromine.

5. The product of Claim 1 wherein the Y substituent is hydroxy or keto.

6. The product of Claim 1 wherein R' is $CH_2OH$.

7. A process comprising: reducing with a hydride a 4,6,8 triene compound of the formula

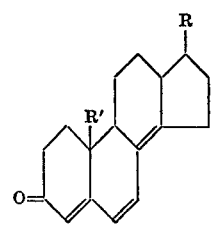

wherein R' is CH₂OH, to form a compound of the formula

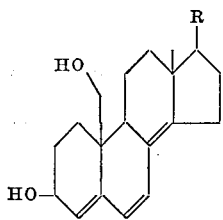

and subsequently hydrogenating the latter to form a compound of the 5-α series of formula (I)

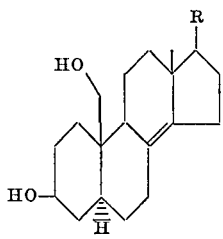

wherein in the above formulae, R is selected from the group consisting of

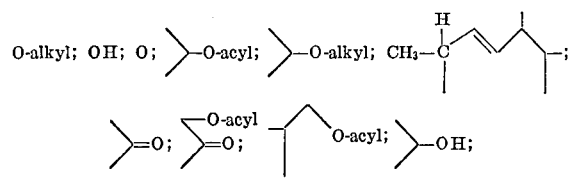

wherein alkyl is tetrahydropyranyl or lower alkyl, wherein acyl represents a group selected from those consisting of acetate, lower trialkyl acetates, monohalo acetates and trihalo acetates.

8. A process as defined in Claim 7, wherein the hydrogenation is carried out in the presence of t-butylamine.

9. A steroid represented by one of the following formulae:

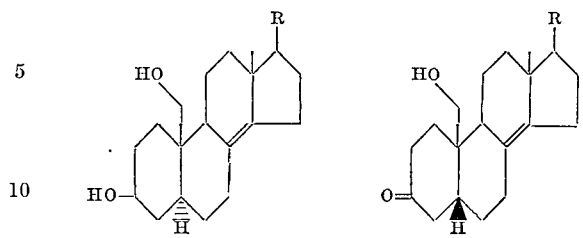

wherein R is as defined in Claim 7.

10. An 8(14)-ene steroid of Claim 1 selected from the group consisting of
3β,19,17β-triacetoxy,
3β,19-dihydroxy-17β-pivaloxy,
3β,19-di(tetrahydropyran-2'-yloxy)-17β-hydroxy,
3β,19-dihydroxy-20β-pivaloxy, and
3β,19,20β-trihydroxy-5α-pregn-8(14)-ene.

11. The steroid of Claim 1 which is 19-hydroxy-17β-pivaloxy-5β-androst-8(14)-ene-3-one.

References Cited
UNITED STATES PATENTS

| | | | |
|---|---|---|---|
| 2,802,014 | 8/1957 | Laubach | 260—397.45 |
| 3,377,341 | 4/1968 | Christiansen | 260—239.55 |
| 2,897,213 | 7/1959 | Jones et al. | 260—397.2 |

OTHER REFERENCES

Rodd's Chemistry of Carbon Compounds, 2nd ed., vol. II (1970), pp. 150–297 and 395.

Kirk: Steroid Reaction Mechanisms, monograph 7 (1968), pp. 81–88.

HENRY A. FRENCH, Primary Examiner

U.S. Cl. X.R.

260—239.57, 397.3, 397.4, 397.45, 397.5

UNITED STATES PATENT OFFICE
CERTIFICATE OF CORRECTION

PATENT NO. : 3,849,402
DATED : November 19, 1974
INVENTOR(S) : Gunther Kruger

It is certified that error appears in the above-identified patent and that said Letters Patent are hereby corrected as shown below:

Column 2, lines 20-25; first formula should read-- 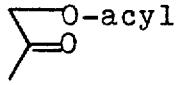

Column 3, lines 50-55; second formula; delete "H" in Formula (X)

Column 3, line 63; correct--tertiary--

Column 4, line 39; correct--dienes-- (2nd occurrence)

Column 4, line 69; correct--acetylation--

Column 5, line 42; correct--unaffected--

Column 5, line 45; correct--being--
Column 7, line 64; correct--above-discussed--
Column 8, line 19; correct--Angewandte--

Column 8, line 38; correct--cardenolides--

Column 8, line 38; correct--19-norcardenolides--

Column 8; Formula I; correct-- 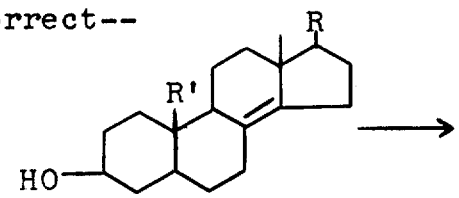

UNITED STATES PATENT OFFICE
CERTIFICATE OF CORRECTION

PATENT NO. : 3,849,402
DATED : November 19, 1974
INVENTOR(S) : Gunther Kruger    PAGE -2

It is certified that error appears in the above-identified patent and that said Letters Patent are hereby corrected as shown below:

Column 8, line 74; correct--transformation--

Column 9, lines 18-20 correct the formula to read--

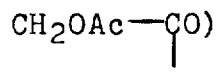

Column 11, line 51; correct--triene--

Column 12, line 46; correct--pivaloxypregna- --

Column 12, line 74; --no spaces should appear on either side of the hyphens--

Column 13, line 10; --no spaces should appear on either side of the hyphens--

Column 13, line 11; --no spaces should appear on either side of the hyphen--

Column 13, line 15; no spaces should appear on either side of the hyphens--

Column 13, lines 16, 24, 25, 28, 29, 33, 37, 38, 44, 56, 57, 66, 67; --no spaces should appear on either side of the hyphens--

Column 14, line 3; correct--triacetoxy-5α--

Column 14, lines 3, 6, 9, 10, 16, 28, 33, 40; --no spaces should appear on either side of the hyphens

UNITED STATES PATENT OFFICE
CERTIFICATE OF CORRECTION

PATENT NO. : 3,849,402
DATED : November 19, 1974
INVENTOR(S) : Gunther Kruger                                   PAGE - 3

It is certified that error appears in the above-identified patent and that said Letters Patent are hereby corrected as shown below:

Column 14, line 41; correct--pivaloxypregna--

Column 14, lines 55, 65, 75; --no spaces should appear on either side of the hyphen--

Column 15, line 16; correct--afforded--
Column 15, line 55; correct "ene-3-" to read--en-3- --
Column 15, lines 16, 21, 30, 33, 37, 38, 44, 45, 55, 61, 73, 74--
no spaces should appear on either side of the hyphen--

Column 16, lines 25, 32, 42, 43, 50, 59, 63, 75; --no spaces should appear on either side of the hyphen--

Column 17, lines 6, 33; --no spaces should appear on either side of the hyphen--

Column 17, line 40; correct--vacuum--

Column 17, line 51; --no space should appear between (methoxyethoxy) and alumin- --

Column 18, line 64; correct--latter--

Column 19, line 6; --no spaces should appear on either side of the hyphen--

Column 19, line 32; change "ene" to--en--

Column 19, line 35; change "both" to--a bath--

Column 20, line 58; change "$R_2$" to--$R'$--

UNITED STATES PATENT OFFICE
CERTIFICATE OF CORRECTION

PATENT NO. : 3,849,402
DATED : November 19, 1974
INVENTOR(S) : Gunther Kruger

PAGE - 4

It is certified that error appears in the above-identified patent and that said Letters Patent are hereby corrected as shown below:

Column 21; line 10; correct the formula at the beginning of the line to read--

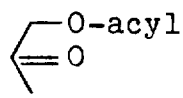

Column 22, Formula (VI) correct to read--

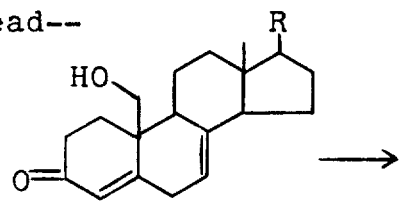

Column 22, Formula (VII); change " ı|O" to-- ı|OY--
Column 22, Formula (VIII) correct to read--

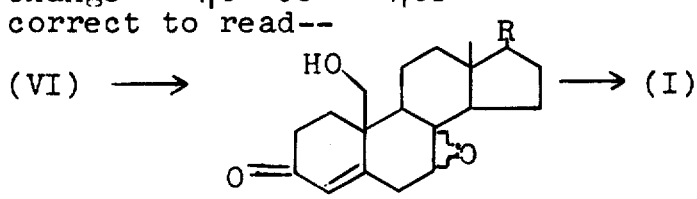

Column 23, line 55; correct--latter--

Column 24, line 5; correct--sodium--

Column 24, line 6; correct--sodium--

Column 24, line 14; correct--atmosphere--

UNITED STATES PATENT OFFICE
CERTIFICATE OF CORRECTION

PATENT NO. : 3,849,402
DATED : November 19, 1974
INVENTOR(S) : Gunther Kruger                                    PAGE - 5

It is certified that error appears in the above-identified patent and that said Letters Patent are hereby corrected as shown below:

Column 24, line 51; correct--tertiary--

Column 26; line 26; after "of" insert--O-acyl or--

Column 26, line 30; correct--alkyl-- (2nd occurrence)

Column 26, lines 31-39 should read

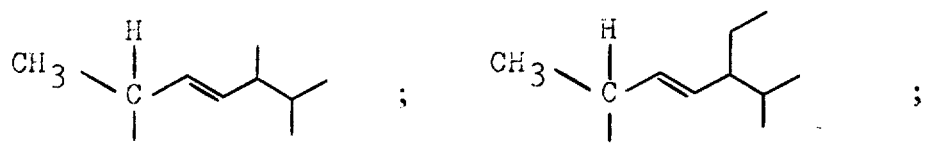

Column 27, lines 30-34; before " $\rangle$=O" insert

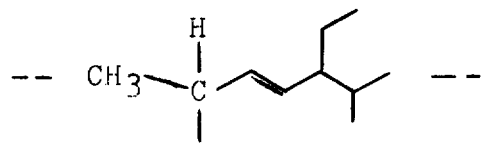

Signed and sealed this 10th day of June 1975.

(SEAL)
Attest:

RUTH C. MASON
Attesting Officer

C. MARSHALL DANN
Commissioner of Patents
and Trademarks